(12) United States Patent
Schirrmeister et al.

(10) Patent No.: US 8,721,766 B2
(45) Date of Patent: May 13, 2014

(54) CERAMIC MEMBRANE HAVING A CATALYTIC MEMBRANE-MATERIAL COATING

(75) Inventors: Steffen Schirrmeister, Muelheim an der Ruhr (DE); Bernd Langanke, Holzwickede (DE); Bjoern Hoting, Berlin (DE)

(73) Assignee: Thyssenkrupp UHDE GmbH, Berlin (DE)

( * ) Notice: Subject to any disclaimer, the term of this patent is extended or adjusted under 35 U.S.C. 154(b) by 214 days.

(21) Appl. No.: 13/393,442

(22) PCT Filed: May 19, 2010

(86) PCT No.: PCT/EP2010/003094
§ 371 (c)(1),
(2), (4) Date: Apr. 2, 2012

(87) PCT Pub. No.: WO2011/023252
PCT Pub. Date: Mar. 3, 2011

(65) Prior Publication Data
US 2012/0204716 A1 Aug. 16, 2012

(30) Foreign Application Priority Data
Aug. 31, 2009 (DE) .......................... 10 2009 039 149

(51) Int. Cl.
*B01D 53/22* (2006.01)
(52) U.S. Cl.
USPC ................ 95/54; 95/43; 95/45; 96/4; 96/7; 96/9
(58) Field of Classification Search
CPC ................ B01D 53/22; B01D 53/228; C01B 2210/0046
USPC ................ 95/43, 45, 54; 96/4, 7, 9
See application file for complete search history.

(56) References Cited

U.S. PATENT DOCUMENTS

| | | | |
|---|---|---|---|
| 4,791,079 A | 12/1988 | Hazbun | |
| 5,498,278 A * | 3/1996 | Edlund | 96/11 |
| 5,534,471 A * | 7/1996 | Carolan et al. | 502/4 |
| 5,645,626 A * | 7/1997 | Edlund et al. | 95/56 |
| 5,820,655 A | 10/1998 | Gottzmann et al. | |

(Continued)

FOREIGN PATENT DOCUMENTS

| DE | 69026752 | 11/1996 |
|---|---|---|
| DE | 102005005464 | 8/2006 |

(Continued)

OTHER PUBLICATIONS

International Search Report for PCT/EP2010/003094, English translation attahced to original, Both completed by the European Patent Office on Dec. 10, 2010, All together 8 Pages.

(Continued)

*Primary Examiner* — Jason M Greene
*Assistant Examiner* — Anthony Shumate
(74) *Attorney, Agent, or Firm* — Brooks Kushman P.C.

(57) ABSTRACT

A porously coated, densely sintered ceramic membrane, which can be produced from a green membrane and subsequent sintering. The membrane is coated with ceramic material, which contains noble metals, which can be produced by application and subsequent thermal treatment. The noble metals are contained at a concentration of 2.5 to 5 mass percent.

20 Claims, 6 Drawing Sheets

(56) References Cited

U.S. PATENT DOCUMENTS

Figure 1:
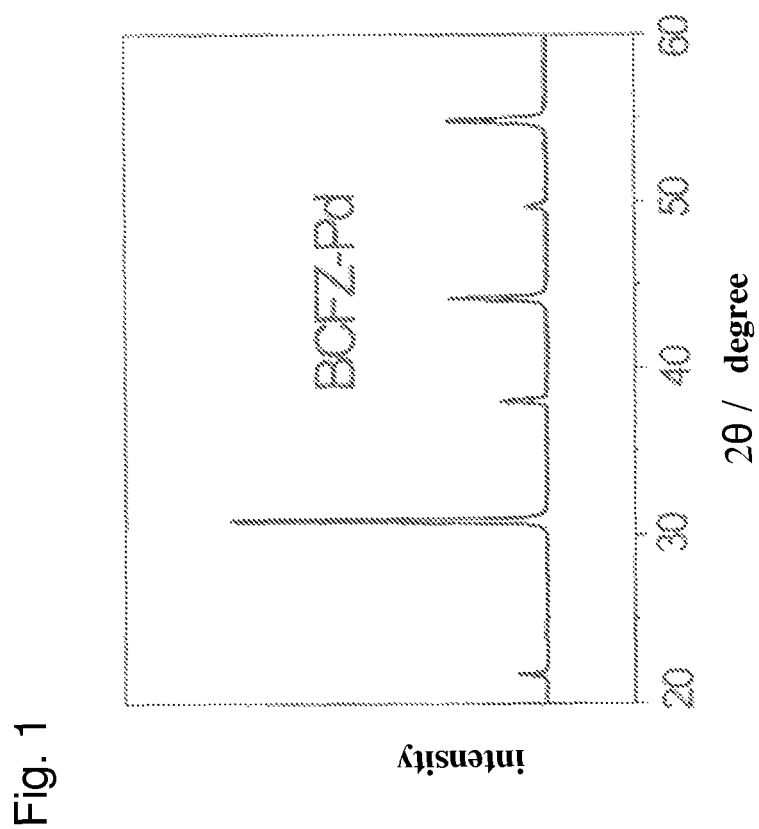

| | | | |
|---|---|---|---|
| 6,010,614 A | 1/2000 | Keskar et al. | |
| 6,033,632 A | 3/2000 | Schwartz et al. | |
| 6,355,093 B1 | 3/2002 | Schwartz et al. | |
| 6,899,744 B2 * | 5/2005 | Mundschau | 95/56 |
| 7,151,067 B2 | 12/2006 | Sakon et al. | |
| 7,866,486 B2 | 1/2011 | Werth et al. | |
| 7,875,154 B2 * | 1/2011 | Park et al. | 204/192.1 |
| 8,075,958 B2 * | 12/2011 | Chellappa et al. | 427/554 |
| 2009/0001009 A1 * | 1/2009 | Linder et al. | 210/243 |
| 2009/0108239 A1 | 4/2009 | Caro et al. | |
| 2009/0272266 A1 | 11/2009 | Werth et al. | |

FOREIGN PATENT DOCUMENTS

| | | |
|---|---|---|
| DE | 102005006571 | 8/2006 |
| DE | 102006060171 | 6/2008 |
| EP | 1452505 | 9/2004 |
| EP | 1847311 | 10/2007 |
| WO | 9741060 | 11/1997 |
| WO | 9921649 | 5/1999 |
| WO | 2006081959 | 8/2006 |

OTHER PUBLICATIONS

Thursfield et al. J. Mater. Chem. 2004, vol. 14, p. 2475-2485, "The use of dense mixed ionic and electronic conducting membranes for chemical production."

Tong et al. Journal of Membrane Science 2002, vol. 203, p. 175-189, "Investigation of ideal zironium-doped perovskite-type ceramic membrane materials for oxygen separation."

Shao et al. Journal of Membrane Science 2000, vol. 172, p. 177-188, "Investigation of the permeation behavior and stability of a ba0/5Sr0.5Co0.8Fe0.2O3- oxygen membrane."

Schiestel et al. Journal of Membrane Science 2005, vol. 258, p. 1-4, "Hollow fibre perovskite membranes for oxygen separation."

Teraoka et al. Chemistry Letters 1985, p. 1743-1746, "Oxygen permeation through perovskite-type oxides."

Teraoka et al. Solid State Ionics 1991, vol. 48, p. 207-212, "Influence of constituent metal cations in substituted $LaCoO_3$ on mixed conductivity and oxygen permeability."

* cited by examiner

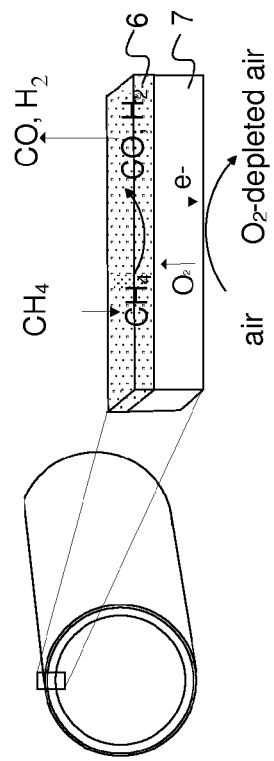
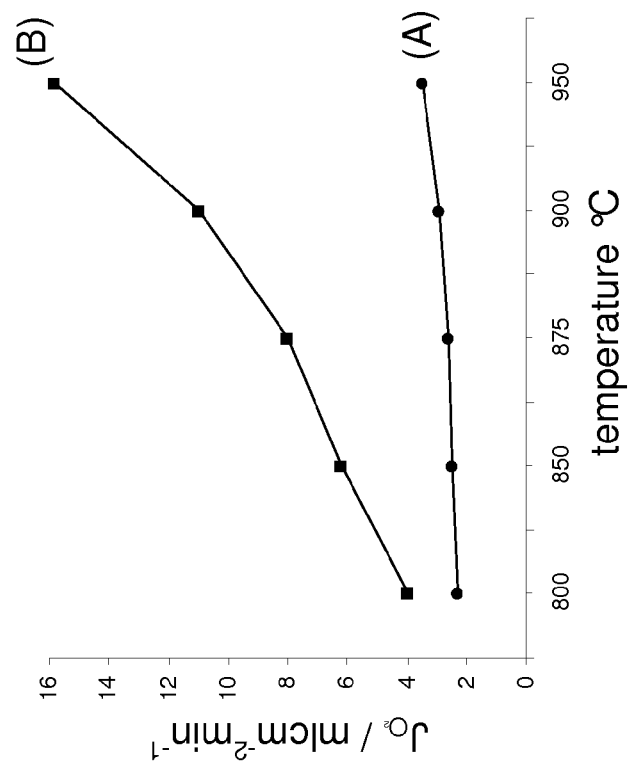
Fig. 4

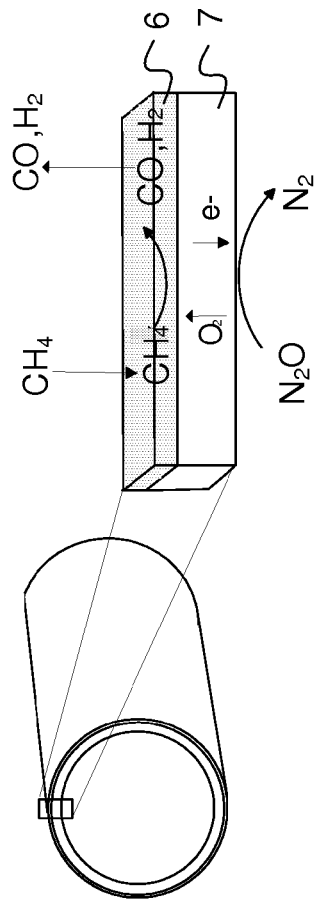
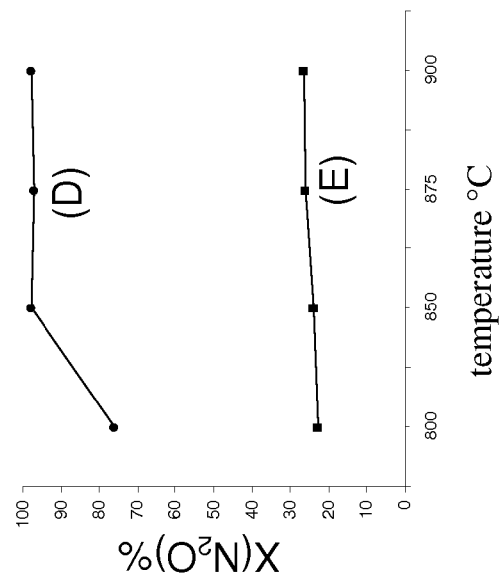
Fig. 6

CERAMIC MEMBRANE HAVING A CATALYTIC MEMBRANE-MATERIAL COATING

CROSS-REFERENCE TO RELATED APPLICATION

This application is the U.S. national phase of PCT Appln. No. PCT/EP2010/003094 filed May 19, 2010, which claims priority to DE application 10 2009 039 149.5 filed Aug. 31, 2009 on the disclosures of which are incorporated in their entirety by reference herein.

The invention relates to coated, densely sintered ceramic membranes producible from a green membrane and submitted to subsequent sintering, the said membrane being coated with a ceramic material containing precious metals of a specific concentration, producible by application and subsequent thermal treatment. Coating of the membrane leads to a significant improvement of the oxygen transfer rate through the membrane and thus to the oxygen enrichment of a membrane reactor which is also claimed.

Ceramic membranes transferring oxygen are particularly applied for high-temperature processes. They constitute a cost-effective alternative, for example, to cryogenic air separation in the recovery of oxygen and are utilised in the production of synthesis gas by partial oxidation of hydrocarbons, such as methane, according to the following reaction equation:

$$2CH_4 + O_2 \rightarrow 2CO + 4H_2 \quad (1)$$

Other applications are, for example, the recovery of oxygen-enriched air as described, for example, in DE 102005 006 571A1, the oxidative dehydrogenation of hydrocarbons or hydrocarbon derivates, the oxidative coupling of methane to $C_{2+}$ and the decomposition of water and nitrous oxide.

As known from the state of the art, oxidation reactions are carried out by using oxygen ion-conductive and electron-conductive (mixed conductive) ceramic materials, use being made of a reactor which is divided into two compartments or sections by a mixed conductive membrane. Gas-tight membranes form the basis, which show the ability to selectively conduct oxygen and electrons at temperatures of >800° C. as mentioned, for example, in WO 2006/081959 A1. During operation, an oxygen-supplying gas or gas mixture is fed on one side of the membrane (feed side) whereas a medium to be oxidised is fed on the opposite side of the membrane (permeate side). Such membrane reactors and processes for their operation are described, for example, in U.S. Pat. No. 5,820,655 A, DE 10 2005 005 464, DE 10 2005 006 571 and DE 10 2006 060 171.

The permeation of oxygen is carried out from the side of the higher partial pressure (feed side, substrate chamber) to the side of the lower partial pressure (permeate side, permeate chamber). The transfer of oxygen through the membrane in ionic form according to equation (2)

$$O_2 + 4e^- \rightarrow 2O^{2-} \quad (2)$$

results in a highly selective separation of the oxygen from the feed gas (feed gas, substrate gas), the said oxygen being obtained in the permeate gas without any impurities, such as nitrogen or noble gases, according to equation (3).

$$2O^{2-} \rightarrow O_2 + 4e^- \quad (3)$$

The oxygen can react according to equation (1), a driving gradient for the oxygen permeation being maintained on account of the constant oxygen consumption.

Apart from the membrane composition the velocity of the oxygen permeation considerably depends on the operating conditions (T. Schiestel, M. Kilgus, S. Peter, K. J. Capary, H. Wang, J. Caro, Journal of Membrane Science 2005, 258, 1-4). Here, the temperature is of special importance as it has generally a linear to exponential impact on the velocity of oxygen permeation.

As known from the state of the art, typical membrane materials are, for example, from the group of perovskite ($ABO_3$) structures or perovskite-allied structures, fluorite structures ($AO_2$), Aurivillius structures ($[Bi_2O_2][A_{n-1}B_nO_x]$) or brownmillerite structures ($A_2B_2O_5$). Typical examples of systems listed in literature as oxygen-conductive materials or material classes are $La_{1-x}(Ca,Sr,Ba)_xCo_{1-y}Fe_yO_{3-\delta}$, $Ba(Sr)Co_{1-x}Fe_xO_{3-\delta}$, $Sr(Ba)Ti(Zr)_{1-x-y}Co_yFe_xO_{3-\delta}$, $La_{1-x}Sr_xGa_{1-y}Fe_yO_{3-\delta}$, $La_{0.5}Sr_{0.5}MnO_{3-\delta}$, $LaFe(Ni)O_{3-\delta}$, $La_{0.9}Sr_{0.1}FeO_{3-\delta}$ or $BaCo_xFe_yZr_{1-x-y}O_{3-\delta}$ (A. Thursfield et al., Journal of Material Science 2004, 14, 275-285; Y. Teraoka et al., Chemistry Letters 1985, 1743-1746; Y. Teraoka et al., Solid State Ionics 1991, 48, 207-212; J. Tong et al., Journal of Membrane Science 2002, 203, 175-189).

The above-mentioned application of these membrane materials in power plants or plants for the production of synthesis gas is difficult because the alkaline earth elements contained in the membrane materials or their oxides are susceptible to the formation of carbonate in the presence of $CO_2$ forming by exothermic total oxidation, the said carbonate depositing in the membrane structure and blocking it, thus substantially affecting the oxygen transfer rate through the membrane even at high temperatures and failing to further ensure economical operation.

In view of these disadvantages recurring efforts have been made to eliminate these deficits. Some examples are cited below.

U.S. Pat. No. 4,791,079 claims membranes which are used for the oxidation of hydrocarbons and are made up of two layers, layer 1 consisting of an impermeable oxygen ion-conductive and electron-conductive ceramic membrane and layer 2 of a porous ceramic material containing a catalyst. Layer 1 consists of 77-88 mole % of zirconium oxide, 10-13 mole % of a stabiliser oxide and 1-10 mole % of an oxide of the group V-B or VI-B or titanium oxide. Sodium-laden manganese oxide complexes and lithium-laden magnesium oxide complexes are referred to as feasible catalysts of layer 2.

DE 690 26 752 T2 claims a solid multi-component membrane characterised in that the multiphase mixture impermeable to gas consists of 1-75 parts by volume of an electronically conductive phase and 25-99 parts by volume of an ion-conductive phase, the electronically conductive phase containing silver, gold, platinum, palladium, rhodium, ruthenium, bismuth oxide, a praseodymium-indium oxide mixture, a cerium-lanthanum oxide mixture, a niobium-titanium oxide mixture, a magnesium-lanthanum chromium oxide mixture or $YBa_2Cu_3O_x$. It is further explained that this first membrane may be coated with a catalyst. The latter may be a film across the surface of the solid membrane, dispersed or mixed into the surface of the solid membrane, or in the form of individual particles or fibres, filled adjacent to the surface of the cell membrane. Precious metals are not mentioned here.

U.S. Pat. No. 6,010,614 describes membranes which may have a perovskite structure and are optionally provided with a porous layer which is mixed with a catalyst and may also consist of a perovskite structure, precious metals being suggested for this purpose. Concentration ranges of the precious metals are only stated for the use of dual-phase metal-metal oxide combinations, such as $(Pd)_{0.5}/(YSZ)_{0.5}$, but not for the use in a separate porous catalyst-doped layer.

Based on the cited state of the art there is a further demand for improving the application-specific properties of the customary membranes towards $CO_2$-stable membranes showing also improved long-term stabilities, high mechanical stability and increased oxygen transfer properties, the provision of which is the aim of this invention.

Surprisingly it was now found that the coating of a customary densely sintered ceramic membrane well-known in the present state of the art with a ceramic material containing precious metals in a quite specifically defined concentration range positively affects the oxygen transfer rate and the long-term stability of the membrane. The person skilled in the art would rather expect that a high precious metal concentration is always accompanied by improved properties. However, a too high or too low precious metal concentration adversely affects the oxygen transfer rate.

The invention relates to a porously coated, densely sintered ceramic membrane producible from a green membrane and submitted to subsequent sintering, the said membrane being coated with a ceramic material containing precious metals, producible by application and subsequent thermal treatment, the precious metals having a concentration of 0.2 to 5% by mass in the porous coating.

In this description densely sintered ceramic membranes are understood to be tight membranes, in which the gas rate flowing through the remaining pore structure of the membrane at a differential pressure of oxygen of 1 bar is <30%, preferably <5%, of the gas rate permeating by ionic conduction at operating conditions. Operating conditions are understood to mean temperatures between 600° C. and 1000° C. and a supply of oxygen-containing feed gas of 80-200 ml/min and are used in the separation of oxygen from gas mixtures and/or in the performance of oxidation reactions. Typical pressures of oxygen-containing feed gas range between $10^{-2}$ and 100 bar, preferably between 1 and 80 bar, and particularly between 2 and 10 bar. The operating conditions to be selected for each case depend on the respective reaction performed and can be determined by the person skilled in the art by means of routine tests.

According to this invention the non-sintered membranes are called green membranes.

In an advantageous embodiment of the invention the porous coating of the densely sintered ceramic membrane contains precious metals preferably in a concentration of 2.5 to 5% by mass and particularly preferably in a concentration of 3.8 to 4.5% by mass.

The porous coating of the densely sintered ceramic membrane advantageously contains precious metals which are preferably selected from a group comprising silver, ruthenium, platinum and palladium or a mixture of these precious metals. Particularly preferably the porous coating contains the precious metal palladium.

In a preferred embodiment of the invention the porous coating of the densely sintered ceramic membrane has a thickness of 3-10 μm.

In a further embodiment the porously coated, densely sintered ceramic membrane is formed by an oxide ceramics with a perovskite structure or a brownmillerite structure or an Aurivillius structure. The oxide ceramics preferably has a perovskite structure $ABO_{3-\delta}$, A implying bivalent cations and B implying trivalent or higher-valent cations, the ionic radius of A being larger than the ionic radius of B and δ being a number between 0.01 and 0.9, preferably between 0.7 and 0.9, in which A and/or B may be mixtures of different cations.

The cations of type A are advantageously selected from chemical elements of group 2, group 11, group 12 of the periodic table or the group of lanthanides or are mixtures of these cations, preferably from $Mg^{2+}$, $Ca^{2+}$, $Sr^{2+}$, $Ba^{2+}$, $Cu^{2+}$, $Ag^{2+}$, $Zn^{2+}$, $Cd^{2+}$ and/or the lanthanides and the cations of type B are selected from cation elements of groups 3 to 10 of the periodic table of the elements and/or the group of lanthanides, the metals of group 15 or are mixtures of these cations, preferably from $Fe^{3+}$, $Fe^{4+}$, $Ti^{3+}$, $Ti^{4+}$, $Zr^{3+}$, $Zr^{4+}$, $Ce^{3+}$, $Ce^{4+}$, $Mn^{3+}$, $Mn^{4+}$, $Co^{2+}$, $Co^{3+}$, $Nd^{3+}$, $Nd^{4+}$, $Gd^{3+}$, $Gd^{4+}$, $Sm^{3+}$, $Sm^{4+}$, $Dy^{3+}$, $Dy^{4+}$, $Ga^{3+}$, $Yb^{3+}$, $Al^{3+}$, $Bi^{4+}$ or are mixtures of these cations.

In a particularly preferred embodiment of the present invention the oxide ceramics consists of $BaCo_aFe_bZr_cO_{3-\delta}$, wherein a+b+c=1 and δ is a number between 0.01 and 0.9, preferably between 0.7 and 0.9.

The oxide ceramics of the porous coating of the densely sintered ceramic membrane is optionally different from the oxide ceramics of the densely sintered ceramic membrane. In a particularly preferred embodiment the oxide ceramics of the porous coating of the densely sintered ceramic membrane consists of $BaCo_aFe_bZr_cN_dO_{3-\delta}$, wherein a+b+c+d=1 with d=0.01 to 0.5 and δ is a number between 0.01 and 0.9, preferably between 0.7 and 0.9 and N stands for a precious metal.

In a preferred embodiment of the invention the porously coated, densely sintered ceramic membrane is of the hollow-fibre type producible from a green hollow fibre with a random cross-sectional geometry and submitted to subsequent sintering. In sintered state the coated, densely sintered ceramic membrane is of a non-linear, arched or bent form of preference, the said hollow fibre being porously coated with ceramic material containing precious metals, producible by application and subsequent thermal treatment. In an advantageous embodiment the said hollow fibre of a round cross-sectional geometry has an outside diameter of 0.1 mm to 5 mm and an inside diameter of 0.01 mm to 4.5 mm.

In this description hollow fibres are understood to be structures which have a hollow interior space and external dimensions, i.e. diameters, or other linear dimensions that are optional. The hollow fibres may be of any cross-section, e.g. square, ellipsoidal or especially circular, as desired.

The hollow fibres can be sintered to form bonds as described in DE 10 205 005 464 B4. Such bonds may then be joined to form membrane modules. These systems are especially suitable for high-temperature applications, such as in gas separation or also as membrane reactor components.

The spinning process used for the production of hollow fibres may be a solution spinning process, such as dry or wet spinning, or a melt spinning process.

The corresponding production process for the porously coated, densely sintered ceramic membranes claimed in this invention includes the following steps:

a) solving the constituents of the ceramic material in water and mixing them with EDTA acid and citric acid in a ratio of EDTA acid:citric acid:metal cations of 1:1.5:1, the pH value being adjusted to 9, b) condensation under supplied heat in a temperature range between 100° C. and 200° C., a gel being formed, c) thermal treatment of the gel at a temperature of up to 700° C. for 1-2 h, an amorphous powder being formed, d) calcination of the amorphous powder in a temperature range between 800° C. and 1100° C. for 8-10 h at a continuous temperature rise of 2° C. to 5 K/min., e) pressing the powder at 100-200 kN for 10-25 minutes and subsequent extrusion to form green membranes, f) pressureless sintering for 8-16 h at 1000° C. to 1400° C. in an air atmosphere at a continuous temperature rise or drop of 2 to 5 K/min, a ceramic membrane being formed, g) solving a ceramic material containing precious metals and treated according to steps a) to d) in citric acid and subsequent grinding, an aqueous mass being formed, h) application of the aqueous mass onto the ceramic membrane produced according to f), i) thermal treatment at 1000° C. to 1100° C. for 0.5-1.5 h, the precious metals of the porous coating being admixed in a concentration of 1 to 5% by mass.

The present invention also encompasses a membrane reactor for selective gas separation consisting of at least one porously coated, densely sintered ceramic membrane, which subdivides the membrane reactor into at least one permeate chamber (permeate gas chamber) and at least one substrate chamber (feed gas chamber); of at least one feed line for a feed gas (feed gas, substrate gas) containing oxygen and/or an oxygen-releasing compound, the feed line being connected to the substrate chamber; of at least one discharge line for a feed gas depleted of oxygen and/or of at least an oxygen-releasing compound, the discharge line being connected to the substrate chamber; of at least, if required, one feed line for a purge gas containing, if required, at least one reactant; this feed line being connected to the permeate chamber; and at least one discharge line for oxygen, for a gas mixture containing oxygen and/or a purge gas containing oxidised reactant, this feed line being connected to the permeate chamber.

Such a membrane reactor is advantageously used for the separation of gas constituents, preferably oxygen, from gas mixtures, particularly air. The separated oxygen is appropriately used for the subsequent oxidation reaction in the gas phase. In this context, the oxidation reaction is a partial oxidation of a hydrocarbonaceous gas mixture for the production of synthesis gas or an oxidative dehydrogenation of hydrocarbons or even an oxidative coupling of methane.

The separated oxygen may alternatively be used for power plant applications. This concerns, for example, the provision of low $CO_2$ power plants which are also called oxyfuel systems. In these systems, the oxygen to be separated is provided by using air as feed gas. The permeated oxygen is removed by part of the hot flue gases of the combustion chamber, especially by $CO_2$ and water vapour if any. This flue gas enriched with oxygen is then fed back as oxidant to the combustion chamber. Hence, in oxyfuel processes the flue gas mainly consists of $CO_2$ and water vapour. Downstream of the combustion chamber the water is separated from the part of the flue gas not required for oxygen recovery and the residual $CO_2$ is stored in, for example, former natural gas and oil production sites, said storage avoiding the emission of $CO_2$ from power plant operation.

Any gases containing oxygen and/or oxygen-releasing compounds may be used as feed gases. Examples are water vapour, nitric oxides, such as $NO_x$ or $N_2O$, carbon oxides, such as $CO_2$ or CO, and sulphur oxides, such as $SO_x$. Particular preference is given to air as feed gas. The oxygen content of the feed gas is typically at least 5% by volume. Examples of oxygen-releasing components are water vapour, nitric oxides, such as $NO_x$ or $N_2O$, carbon oxides, such as $CO_2$ or CO, and sulphur oxides, such as $SO_x$ with x=1-3.

Gases of any type may be used as purge gases, provided the oxygen partial pressure gradient in the membrane can be maintained. In a variant, oxygen-containing and nitrogen-containing gases are used, for example, air. In another variant, gases are used which contain oxidisable components, if required in combination with oxygen and nitrogen. The purge gas may contain inert and/or oxidisable components, such as water vapour and/or carbon dioxide as well as saturated and/or unsaturated aliphatic and/or aromatic and/or araliphatic hydrocarbons. The use of hydrocarbons as purge gas is particularly preferred.

The production process for a porously coated, densely sintered ceramic membrane is detailed in the following in an exemplary mode. In this example, $BaCo_aFe_bZr_cO_{3-\delta}$ and $BaCo_aFe_bZr_cN_dO_{3-\delta}$ are particularly produced, N standing for palladium in this example. In the following this type of membrane composition is also referred to as BCFZ and BCFZ-Pd.

$Ba(NO_3)_2$, $ZrO(NO_3)_2$, $Co(NO_3)_2$ and $Fe(NO_3)_2$, as well as $Pd(NO_3)_2$ if required, are dissolved in aqueous solution and the solution obtained is mixed with EDTA acid and citric acid in a ratio of EDTA acid:citric acid:metal cations of 1:1.5:1, the pH value being adjusted to 9 by means of $NH_4OH$. This is a well-established process and published in Shao et al, J. Membr. Sci, 2000, 172-177. This solution is then heated in a temperature range between 100° C. and 200° C. under constant stirring, a gel being formed. The gel is subjected to another thermal treatment at a temperature of up to 700° C. for 1-2 h, an amorphous powder being formed. This is followed by the calcination of the amorphous powder in a temperature range of approx. 950° C. for a period of 10 h, taking place at a continuous temperature rise of 2° C. to 5 K/min. The powder is then pressed at 100-200 kN for 10-25 minutes and extruded to form green membranes. Sintering takes place for 15 h at 1300° C. in an air atmosphere at a continuous temperature rise or drop of 2-5 K/min, a ceramic membrane being formed. This membrane is then coated with an aqueous mass containing $Pd(NO_3)_2$, produced in accordance with the above steps, and subjected again to a thermal treatment at 1050° C. for 1 h.

The chemical composition of the resulting membranes is as shown in Table 1:

TABLE 1

|  | $BaCo_aFe_bZr_cO_{3-\delta}$ | $BaCo_aFe_bZr_cN_dO_{3-\delta}$ |
|---|---|---|
| $Ba(NO_3)_2$ | 0.025 mol | 0.025 mol |
| $Co(NO_3)_2$ | a | a |
| $Fe(NO_3)_3$ | b | b |
| $ZrO(NO_3)_2$ | c | c – 0.00075 mol |
| N |  | 0.00075 mol |
| EDTA | 0.05 mol | 0.05 mol |
| Citric acid | 0.075 ml | 0.075 ml |
| 35% $NH_3*H_2O$ | 100 ml | 100 ml |

The following applies: a + b + c = 0.025 mol for a BCFZ membrane without precious metals and a + b + c + d = 0.025 mol for BCFZ membranes with precious metals N, N standing for Ag, Ni, Pd and Ru.

The hollow fibre membranes are produced according to the inversion spinning process and subsequent sintering process as published in Schiestel T. et al., J. Membr. Sci 2005, 258, 1.

It was found that different sintering conditions result in different porosities of the ceramic membrane surface. So, the BCFZ or BCFZ-Pd coating according to the above-mentioned sintering conditions is still porous but the BCFZ membrane itself is a densely sintered layer. The porosity of the coating gives a larger surface, as a result of which a higher catalytic activity is to be expected.

The following is to show the oxygen flow depending on the Pd concentration in percent by mass in the porous coating of the densely sintered ceramic membrane.

For this purpose, a porously coated, densely sintered ceramic membrane consisting of material $BaCo_{0.4}Fe_{0.4}Zr_{0.2}O_3$ was used. The membrane coating consisted of $BaCo_{0.4}Fe_{0.4}Zr_{0.2-x}Pd_xO_3$. The test was carried out at a temperature of 900° C. Air was used as feed gas at 150 ml/min, the permeate side being charged with a gas mixture consisting of 39 ml/min He, 10 ml/min $CH_4$ and 1 ml/min Ne. Table 2 shows the palladium content of the respective porous coating and the oxygen flow rate achieved:

TABLE 2

| Pd in the porous coating [% by mass] | Composition of the porous coating | Oxygen flow through the membrane; $O_2$ [ml cm$^{-2}$min$^{-1}$] |
|---|---|---|
| No coating | $BaCo_{0.4}Fe_{0.4}Zr_{0.2}O_3$ | 1 |
| X = 0.00 Pd = 0.00 g Pd = 0.0% Pd | $BaCo_{0.4}Fe_{0.4}Zr_{0.2-0}Pd_0O_3$ | 2.4 |
| X = 0.01 Pd = 1.06 g Pd = 0.425% Pd | $BaCo_{0.4}Fe_{0.4}Zr_{0.19}Pd_{0.01}O_3$ | 2.6 |
| X = 0.02 Pd = 2.12 g Pd = 0.85% Pd | $BaCo_{0.4}Fe_{0.4}Zr_{0.18}Pd_{0.02}O_3$ | 2.8 |
| X = 0.05 Pd = 5.3 g Pd = 2.12% Pd | $BaCo_{0.4}Fe_{0.4}Zr_{0.15}Pd_{0.05}O_3$ | 5.6 |
| X = 0.1 Pd = 10.6 g Pd = 4.25% Pd | $BaCo_{0.4}Fe_{0.4}Zr_{0.1}Pd_{0.1}O_3$ | 9.5 |
| X = 0.15 Pd = 15.9 g Pd = 6.37% Pd | $BaCo_{0.4}Fe_{0.4}Zr_{0.05}Pd_{0.15}O_3$ | 1.1 |
| X = 0.2 Pd = 21.2 g Pd = 8.5% Pd | $BaCo_{0.4}Fe_{0.4}Pd_{0.2}O_3$ | 0.2 |

Based on the results shown in the table it can be concluded that with an increasing Pd content of up to 4.25% by mass the oxygen flow across the porously coated, densely sintered ceramic membrane is increased. Coating with the porous catalytic material causes an accelerated consumption of the oxygen which in turn is consumed by methane oxidation. This causes an increase in the oxygen gradient across the membrane as driving force and more oxygen is transported across the membrane. The higher the Pd content in the porous coating, the higher the acceleration of the methane oxidation. However, the oxygen flow surprisingly decreases from a Pd content >4.25% by mass. With higher Pd contents, the crystalline perovskite structure is destroyed, thus inhibiting the oxygen flow. From these results it also follows that the densely sintered ceramic membrane with porous coating without palladium facilitates a higher oxygen flow than the densely sintered ceramic membranes without any coating.

By way of example the invention is detailed in the following by six figures showing:

FIG. 1: An XRD profile of a BCFZ-Pd powder serving for the coating of the densely sintered ceramic BCFZ membrane.

Figure 2:
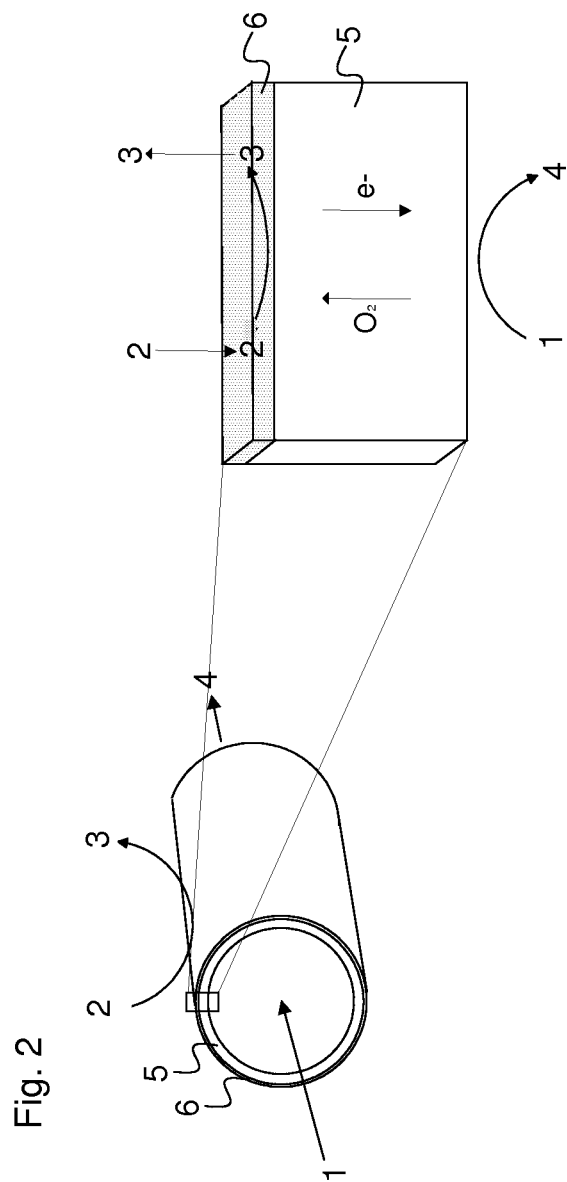

FIG. 2: An inventive representation of a coated, densely sintered ceramic membrane showing the oxygen and electron transport through the membrane.

Figure 3:
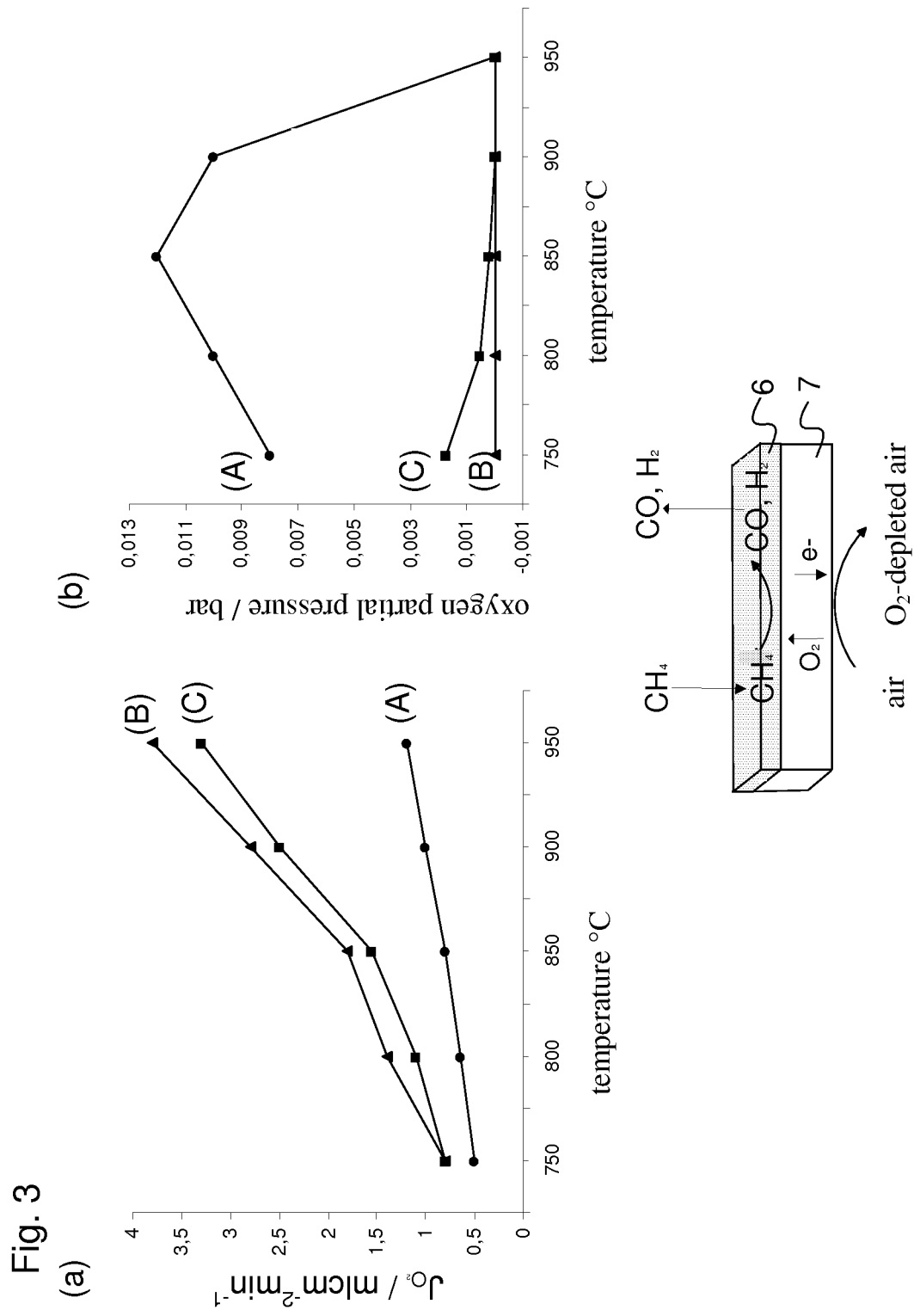

FIG. 3: (a) Dependence on temperature of the oxygen flow through a BCFZ membrane without porous coating (A), with porous BCFZ coating (C) and with porous BCFZ-Pd coating (B) of a gas mixture consisting of $CH_4$, Ne and He on the permeate side, the membranes being in the form of disks; (b) dependence on temperature of the residual oxygen partial pressure on the permeate side of the BCFZ membrane without porous coating (A), with porous BCFZ coating (C) and with porous BCFZ-Pd coating (B) of a gas mixture consisting of $CH_4$, Ne and He on the permeate side, the membranes being in the form of disks. The schematic representation of the reaction course is also shown.

FIG. 4: Dependence on temperature of the oxygen flow through a BCFZ membrane without porous coating (A) and with porous BCFZ-Pd coating (B) of a gas mixture consisting of $CH_4$, Ne and He on the permeate side, the membranes being designed as hollow fibres, and schematic representation of the reaction course.

Figure 5:
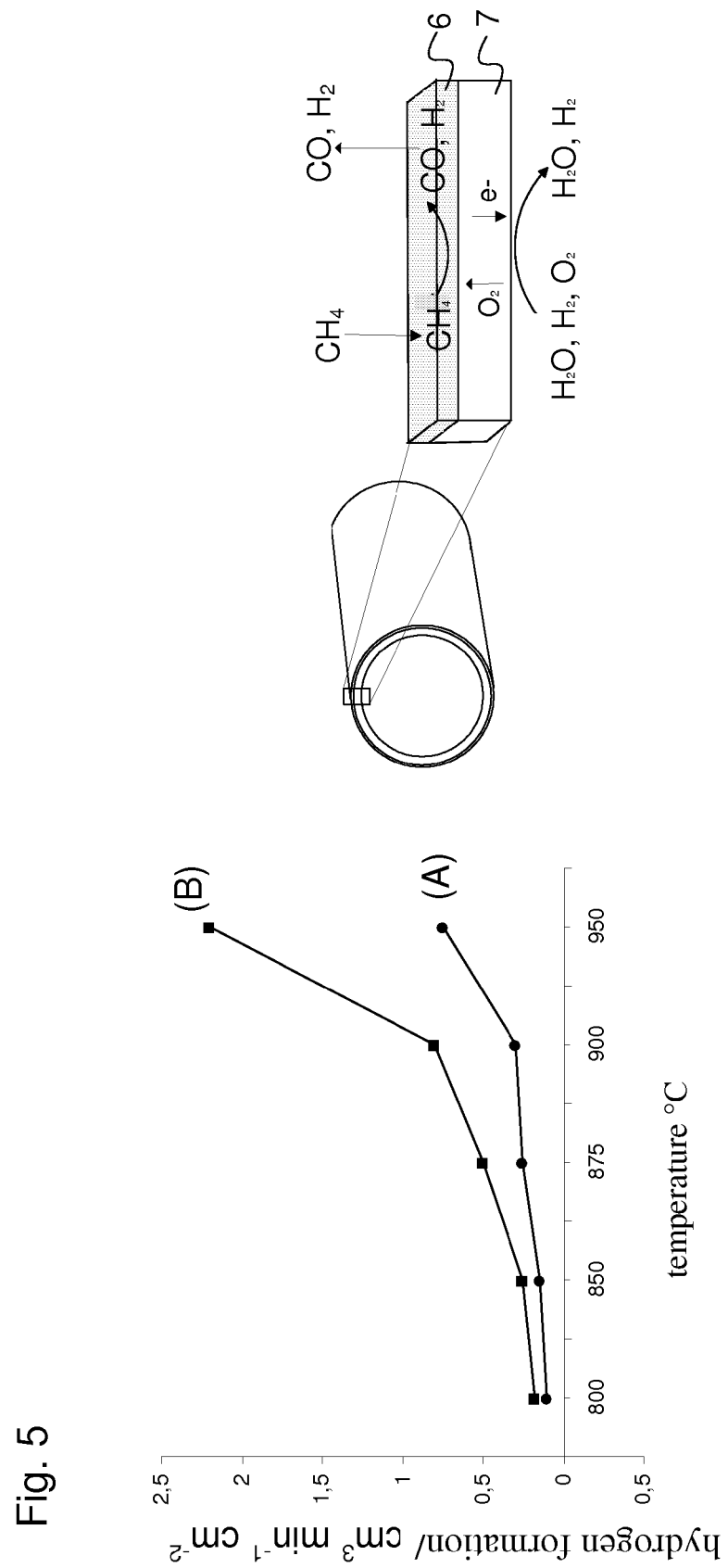

FIG. 5: Dependence on temperature of the hydrogen formation by means of a BCFZ membrane without porous coating (A) and by means of a BCFZ membrane with porous BCFZ-Pd coating (B) of a gas mixture consisting of $CH_4$, Ne and He on the permeate side, the membranes being designed as hollow fibres, and schematic representation of the reaction course.

FIG. 6: Nitrous oxide decomposition with oxygen discharge (D) and without oxygen discharge (E), and schematic representation of the reaction course.

FIG. 1 shows the profile of an X-ray diffraction analysis (XRD) of a BCFZ-Pd powder used for the coating of the densely sintered ceramic BCFZ membrane. From the diagram it follows that Pd deposits in an optimum way in the BCFZ reticular structure. This investigation was based on a BCFZ powder having a Pd content of 4.2% by mass, corresponding to a good oxygen flow rate as can be seen from the above table. These results were also confirmed by means of scanning transmission electron microscopy (STEM) (data not shown here).

FIG. 2 shows a hollow fibre formed of densely sintered ceramic material 5. This hollow fibre is coated with a porous ceramic material 6 which resembles or is similar to the hollow fibre itself and may contain precious metals. An oxygen-rich gas 1, consisting of, for example, air, $H_2O$, or $N_2O$, is passed through this hollow fibre at a pressure of approx. 4 bar. Oxygen in ionic form is passed through the densely sintered ceramic material 5 and its porous coating 6 and this results in a highly selective separation of the oxygen from the oxygen-rich gas 1. The oxygen can then react with methane 2 which diffuses into the porous coating 6 of the densely sintered ceramic material 6, as a result of which a driving gradient for the oxygen permeation is maintained by the constant consumption of the oxygen. This reaction, which takes place at a temperature of 850° C., yields an oxygen-depleted gas 4 and a synthesis gas 3.

Since major part of the conversion of methane 2 already takes place in the porous coating 6, the destruction of the densely sintered ceramic material 5 is prevented by avoiding as far as possible a carbonate formation of the alkaline earth oxides contained in the membrane material with $CO_2$. As a result, on the one hand, the mechanical stability of the hollow fibre is ensured by the densely sintered ceramic material 5 and, on the other hand, the long-term stability during operation is considerably improved by the porous coating 6.

FIG. 3 (a) shows the temperature-dependent oxygen flow rate through a densely sintered BCFZ membrane (A), through a densely sintered BCFZ membrane coated with BCFZ (C) and through a densely sintered BCFZ membrane provided with a porous BCFZ-Pd coating (B). The porously coated, densely sintered ceramic membrane consisted of material $BaCo_{0.4}Fe_{0.4}Zr_{0.2}O_3$. The coating of the membrane consisted of $BaCo_{0.4}Fe_{0.4}Zr_{0.2-x}Pd_xO_3$, wherein x=0 or x=0.1. The test was carried out at a temperature of 900° C. Air was used as feed gas at 150 ml/min, the permeate side being charged with a gas mixture consisting of 39 ml/min He, 10 ml/min $CH_4$ and 1 ml/min Ne. The test was carried out with a membrane thickness of 1.0 mm and a membrane surface area of 1.06 cm$^2$. It can clearly be seen that the oxygen flow rate across the individual membranes is as follows: BCFZ with BCFZ-Pd coating (B)>BCFZ with BCFZ coating (C)>BCFZ without coating (A).

FIG. 3 (b) shows the temperature-dependent residual oxygen partial pressure on the permeate side of the respective membrane. The measurement results are as follows: BCFZ with BCFZ-Pd coating (B)<BCFZ with BCFZ coating (C)<BCFZ without coating (A). It can be concluded that the addition of palladium in an appropriate concentration affects the membrane properties in a positive way.

FIG. 4 shows the temperature-dependent oxygen flow rate through a BCFZ hollow fibre membrane without porous coating (A) and through a BCFZ hollow fibre membrane provided with a BCFZ-Pd coating (B). The porously coated, densely sintered ceramic hollow fibre membrane consists of material $BaCo_{0.4}Fe_{0.4}Zr_{0.2}O_3$. The coating of the membrane consisted of $BaCo_{0.4}Fe_{0.4}Zr_{0.2-x}Pd_xO_3$, wherein x=0 or x=0.1. Air was used as feed gas at 150 ml/min, the permeate side being charged with a gas mixture consisting of 39 ml/min He, 10 ml/min $CH_4$ and 1 ml/min Ne. The test was carried out with a membrane surface area of 0.86 $cm^2$. The increase in the oxygen flow across the membrane on account of the porous Pd coating becomes even clearer in this example by the fact that at a temperature of 950° C. the oxygen flow could be increased by 4.5 times as compared to a non-coated membrane hollow fibre.

When using a hollow fibre membrane as described in FIG. 4 the hydrogen formation as well undergoes an increase in the dissociation of water as shown in FIG. 5. It turns out that at 950° C. the hydrogen production with a non-coated BCFZ hollow fibre membrane (A) is 0.7 $cm^3$ $min^{-1}$ $cm^{-2}$, this value being able to be increased to a value of 2.1 $cm^3$ $min^{-1}$ $cm^{-2}$ if a BCFZ-Pd coating (B) is used. 30 ml/min water and 10 ml/min He were used on the feed side, the permeate side being charged with a gas mixture consisting of 39 ml/min He, 10 ml/min $CH_4$ and 1 ml/min Ne.

In the course of this, hydrogen is, in principle, produced as fuel gas for polymer electrolyte membrane (PEM) fuel cells. At high temperatures of more than 900° C. water dissociates into hydrogen and oxygen. Despite only tiniest amounts of hydrogen and oxygen are present in the equilibrium, this reaction can be used for the production of hydrogen if the oxygen can quickly be removed through the hollow fibre membrane and the water quickly dissociates afterwards in order to re-adjust the oxygen equilibrium value. In the course of this, water is passed through the hollow fibre. A high driving force for the oxygen flow through the coated membrane is achieved by immediately consuming the oxygen in the porous coating 6 of the hollow fibre according to the principle shown in FIG. 2 by adding methane in this area with which the transported oxygen reacts to form synthesis gas.

FIG. 6 shows another typical application of a coated, densely sintered ceramic hollow fibre membrane. Here, the decomposition of nitrous oxide is carried out in such a way that synthesis gas forms simultaneously. Nitrous oxide has a specific greenhouse gas effect which is 300 times higher than that of carbon dioxide. Normally, the problem of the nitrous oxide decomposition is that the forming oxygen blocks the catalyst surface, thus preventing new nitrous oxide molecules from being adsorbed and then decomposed. This blockade of the catalytically active centres for the nitrous oxide decomposition by means of oxygen can be lifted by continuously removing the oxygen through the wall of the perovskite hollow fibre membrane. In order to maintain a high driving force for the oxygen flow rate, synthesis gas is produced again in the porous coating 6 of the hollow fibre by consuming oxygen according to the principle shown in FIG. 2. The diagram shows that without the removal of the oxygen the decomposition of nitrous oxides stagnates (E), whereas a 100% decomposition of the nitrous oxide can be achieved (D) by the consumption of oxygen by the production of synthesis gas.

In the tests mentioned the gas concentrations were determined using a gas chromatograph. The oxygen flow rate is based on the change of the oxygen concentration in the oxygen-rich gas 1 as compared to the oxygen-depleted gas 4 (see FIG. 2). The hydrogen formation rate can be calculated by the following equation:

$$J = F_{(total)} * c/S$$

wherein J=hydrogen formation rate, $F_{(total)}$=total flow rate, c=hydrogen concentration and S=membrane surface area.

Advantages of the Invention improved oxygen transport rates
feasible use of $CO_2$-rich purge gases
feasible production of mechanically stable fibres
improved long-term stability of the ceramic fibres

LIST OF REFERENCES USED

1 Oxygen-rich gas
2 Methane
3 Synthesis gas
4 Oxygen-depleted gas
5 Densely sintered ceramic material
6 Porous coating

The invention claimed is:

1. Porously coated, densely sintered ceramic membrane producible from a green membrane and submitted to subsequent sintering, the said membrane being coated with a ceramic material containing precious metals, producible by application and subsequent thermal treatment,
   characterised in that
   the precious metals are contained in the coating in a concentration of 0.2 to 5% by mass.

2. Porously coated, densely sintered ceramic membrane according to claim 1, characterised in that the precious metals are contained in the porous coating in a concentration of 2.5 to 5% by mass and preferably of 3.8 to 4.5% by mass.

3. Porously coated, densely sintered ceramic membrane according to claim 1 or 2, characterised in that the precious metals contained in the porous coating are selected from a group containing silver, ruthenium, platinum and palladium or the porous coating contains a mixture of these precious metals.

4. Porously coated, densely sintered ceramic membrane according to claim 3, characterised in that the porous coating contains palladium.

5. Porously coated, densely sintered ceramic membrane according to one of claims 1 to 4, characterised in that the porous coating has a thickness of 3 to 10 μm.

6. Porously coated, densely sintered ceramic membrane according to one of claims 1 to 5, characterised in that the membrane is formed by an oxide ceramics with a perovskite structure or a brownmillerite structure or an Aurivillius structure.

7. Porously coated, densely sintered ceramic membrane according to claim 6, characterised in that the oxide ceramics preferably has a perovskite structure $ABO_{3-\delta}$, A implying bivalent cations and B implying trivalent or higher-valent cations, the ionic radius of A being larger than the ionic radius of B and δ being a number between 0.01 and 0.9, preferably between 0.7 and 0.9, in which A and/or B may be mixtures of different cations.

8. Porously coated, densely sintered ceramic membrane according to claim 7, characterised in that the cations of type A are selected from chemical elements of group 2, group 11, group 12 of the periodic table or the group of lanthanides or are mixtures of these cations, preferably from $Mg^{2+}$, $Ca^{2+}$, $Sr^{2+}$, $Ba^{2+}$, $Cu^{2+}$, $Ag^{2+}$, $Zn^{2+}$, $Cd^{2+}$ and/or the lanthanides and the cations of type B are selected from elements of groups 3 to 10 of the periodic table and/or the group of lanthanides, the metals of group 15 or are mixtures of these cations, preferably from $Fe^{3+}$, $Fe^{4+}$, $Ti^{3+}$, $Ti^{4+}$, $Zr^{3+}$, $Zr^{4+}$, $Ce^{3+}$, $Ce^{4+}$, $Mn^{3+}$, $Mn^{4+}$, $Co^{2+}$, $Co^{3+}$, $Nd^{3+}$, $Nd^{4+}$, $Gd^{3+}$, $Gd^{4+}$, $Sm^{3+}$, $Sm^{4+}$, $Dy^{3+}$, $Dy^{4+}$, $Ga^{3+}$, $Yb^{3+}$, $Al^{3+}$, $Bi^{4+}$ or are mixtures of these cations.

9. Porously coated, densely sintered ceramic membrane according to claim 7, characterised in that the oxide ceramics consists of $BaCo_aFe_bZr_cO_{3-\delta}$, wherein a+b+c=1 and δ is a number between 0.01 and 0.9, preferably between 0.7 and 0.9.

10. Porously coated, densely sintered ceramic membrane according to claim 6, characterised in that the oxide ceramics of the porous coating is different from the oxide ceramics of the densely sintered ceramic membrane.

11. Porously coated, densely sintered ceramic membrane according to claim 7, characterised in that the oxide ceramics of the porous coating consists of $BaCo_aFe_bZr_cN_dO_{3-\delta}$, wherein a+b+c+d=1 with d=0.01 to 0.5 and δ is a number between 0.01 and 0.9, preferably between 0.7 and 0.9 and N stands for a precious metal.

12. Porously coated, densely sintered ceramic membrane according to one of claims 1 to 11, characterised in that the membrane used is of the hollow-fibre type which in sintered state is of a non-linear, arched or bent form of preference, the said hollow fibre being porously coated with ceramic material containing precious metals.

13. Porously coated, densely sintered ceramic hollow fibre according to claim 12, characterised in that the hollow fibre of a round cross-sectional geometry has an outside diameter of 0.1 mm to 5 mm and an inside diameter of 0.01 mm to 4.5 mm.

14. Production process for porously coated, densely sintered ceramic membranes according to one of claims 1 to 13, including the following steps:
 a) dissolving the constituents of the ceramic material in water and mixing them with EDTA acid and citric acid in a ratio of EDTA acid:citric acid:metal cations of 1:1.5:1, the pH value being adjusted to 9,
 b) condensation under supplied heat in a temperature range between 100° C. and 200° C., a gel being formed,
 c) thermal treatment of the gel at a temperature of up to 700° C. for 1-2 h, an amorphous powder being formed,
 d) calcination of the amorphous powder in a temperature range between 800° C. and 1100° C. for 8-10 h at a continuous temperature rise of 2° C. to 5 K/min.,
 e) pressing the powder at 100-200 kN for 10-25 minutes and subsequent extrusion to form green membranes,
 f) pressureless sintering for 8-16 h at 1000° C. to 1400° C. in an air atmosphere at a continuous temperature rise or drop of 2 to 5 K/min, a ceramic membrane being formed,
 g) dissolving a ceramic material containing precious metals and treated according to steps a) to d) in citric acid and subsequent grinding, an aqueous mass being formed,
 h) application of the aqueous mass onto the ceramic membrane produced according to f),
 i) thermal treatment at 1000° C. to 1100° C. for 0.5-1.5 h, the precious metals of the porous coating being admixed in a concentration of 1 to 5% by mass.

15. Membrane reactor for selective gas separation, consisting of at least a porously coated, densely sintered ceramic membrane according to claims 1 to 13, which subdivides the membrane reactor into at least one permeate chamber and at least one substrate chamber; of at least one feed line for a feed gas containing oxygen and/or an oxygen-releasing compound, the feed line being connected to the substrate chamber; of at least one discharge line for a feed gas depleted of oxygen and/or of at least an oxygen-releasing compound, the discharge line being connected to the substrate chamber; of at least, if required, one feed line for a purge gas containing, if required, at least one reactant; this feed line being connected to the permeate chamber; and at least one discharge line for oxygen, for a gas mixture containing oxygen and/or a purge gas containing oxidised reactant, this feed line being connected to the permeate chamber.

16. A process a membrane reactor according to claim 15, wherein gas constituents, preferably oxygen, are separated from gas mixtures, particularly air.

17. A process according to claim 16, wherein the separated oxygen is provided to the subsequent performance of an oxidation reaction in the gas phase.

18. A process according to claim 17, wherein the separated oxygen is provided to a partial oxidation of a hydrocarbonaceous gas mixture for the production of synthesis gas.

19. A process according to claim 17, wherein the separated oxygen is provided to an oxidative dehydrogenation of hydrocarbons.

20. A process according to claim 17, wherein the separated oxygen is provided to an oxidative coupling of methane.

* * * * *

UNITED STATES PATENT AND TRADEMARK OFFICE
CERTIFICATE OF CORRECTION

PATENT NO.         : 8,721,766 B2
APPLICATION NO.    : 13/393442
DATED              : May 13, 2014
INVENTOR(S)        : Steffen Schirrmeister et al.

It is certified that error appears in the above-identified patent and that said Letters Patent is hereby corrected as shown below:

In the Claims

Column 10, Line 28, Claim 1:

Delete "Porously" and
Insert -- A porously --.

Column 10, Line 29-30, Claim 1:

After "subsequent sintering" delete "the said" and
Insert -- comprising a --.

Column 10, Line 30, Claim 1:

After "membrane" delete "being".

Column 10, Line 33, Claim 1:

After "thermal treatment," delete "characterized in that" and
Insert -- wherein --.

Column 10, Line 36, Claim 2:

Delete "Porously" and
Insert -- The porously --.

Signed and Sealed this
Twenty-third Day of December, 2014

Michelle K. Lee
*Deputy Director of the United States Patent and Trademark Office*

Column 10, Line 37, Claim 2:

After "according to claim 1," delete "characterized in that" and
Insert -- wherein --.

Column 10, Line 40, Claim 3:

Delete "Porously" and
Insert -- The porously --.

Column 10, Line 41, Claim 3:

After "according to claim 1," delete "or 2 characterized in that" and
Insert -- wherein --.

Column 10, Line 46, Claim 4:

Delete "Porously" and
Insert -- The porously --.

Column 10, Line 47, Claim 4:

After "according to claim 3," delete "characterized in that" and
Insert -- wherein --.

Column 10, Line 49, Claim 5:

Delete "Porously" and
Insert -- The porously --.

Column 10, Line 50, Claim 5:

After "according to," delete "one of claims 1 to 4 characterized in that" and
Insert -- claim 1 wherein --.

Column 10, Line 52, Claim 6:

Delete "Porously" and
Insert -- The porously --.

Column 10, Line 53, Claim 6:

After "according to," delete "one of claims 1to 5 characterized in that" and
Insert -- claim 1 wherein --.

Column 10, Line 57, Claim 7:

Delete "Porously" and
Insert -- The porously --.

Column 10, Line 58, Claim 7:

After "according to claim 6," delete "characterized in that" and
Insert -- wherein --.

Column 10, Line 65, Claim 8:

Delete "Porously" and
Insert -- The porously --.

Column 10, Line 66, Claim 8:

After "according to claim 7," delete "characterized in that" and
Insert -- wherein --.

Column 11, Line 11, Claim 9:

Delete "Porously" and
Insert -- The porously --.

CERTIFICATE OF CORRECTION (continued)
U.S. Pat. No. 8,721,766 B2

Column 11, Line 12, Claim 9:

After "according to claim 7," delete "characterized in that" and
Insert -- wherein --.

Column 11, Line 16, Claim 10:

Delete "Porously" and
Insert -- The porously --.

Column 11, Line 17, Claim 10:

After "according to claim 6," delete "characterized in that" and
Insert -- wherein --.

Column 11, Line 21, Claim 11:

Delete "Porously" and
Insert -- The porously --.

Column 11, Line 22, Claim 11:

After "according to claim 7," delete "characterized in that" and
Insert -- wherein --.

Column 11, Line 27, Claim 12:

Delete "Porously" and
Insert -- The porously --.

Column 11, Line 28, Claim 12:

After "according to," delete "one of claims 1 to 11 characterized in that" and
Insert -- claim 1 wherein --.

Column 11, Line 33, Claim 13:

Delete "Porously" and
Insert -- The porously --.

Column 11, Line 34, Claim 13:

After "according to claim 12," delete "characterized in that" and
Insert -- wherein --.

Column 11, Line 37, Claim 14:

Delete "Production" and
Insert -- A production --.

Column 11, Line 37, Claim 14:

After "process for"
Insert -- making --.

Column 11, Line 38-39, Claim 14:

After "according to" delete "one of claims 1 to 13, including" and
Insert -- claim 1 comprising --.

Column 11, Line 40, Claim 14:

After "Dissolving the" delete "constituents" and
Insert -- the salts --.

Column 12, Line 14, Claim 14:

After "according to f),"
Insert -- and --.

CERTIFICATE OF CORRECTION (continued)
U.S. Pat. No. 8,721,766 B2

Column 12, Line 15, Claim 14:

After "for 0.5-1.5h,"
Insert -- wherein --.

Column 12, Line 17, Claim 15:

Delete "Membrane" and
Insert -- A membrane --.

Column 12, Line 17-18, Claim 15:

After "selective gas separation," delete "consisting of at least" and
Insert -- comprising --.

Column 12, Line 19, Claim 15:

After "sintered ceramic membrane" delete "according to claims 1 to 13," and
Insert -- coated with a ceramic material containing precious metals, producible by application and subsequent thermal treatment, wherein the precious metals are contained in the ceramic coating in a concentration of 2.5 to 5% by mass; --.

Column 12, Line 21, Claim 15:

After "one substrate chamber;"
Delete "of".

Column 12, Line 24, Claim 15:

After "the substrate chamber;" delete "of" and
Insert -- and --.

Column 12, Line 26, Claim 15:

Before "at least, if required,"
Delete "of".

CERTIFICATE OF CORRECTION (continued)
U.S. Pat. No. 8,721,766 B2

Column 12, Line 28, Claim 15:

After "at least one reactant;"
Insert -- wherein --.

UNITED STATES PATENT AND TRADEMARK OFFICE
CERTIFICATE OF CORRECTION

PATENT NO. : 8,721,766 B2  
APPLICATION NO. : 13/393442  
DATED : May 13, 2014  
INVENTOR(S) : Schirrmeister et al.

Page 1 of 1

It is certified that error appears in the above-identified patent and that said Letters Patent is hereby corrected as shown below:

On the title page item [73],  
Delete "Thyssenkrupp UHDE GmbH, Berlin" and  
Insert -- Thyssenkrupp UHDE GmbH, Dortmund (DE) and  
Borsig Process Heat Exchanger GmbH, Berlin (DE) --

Signed and Sealed this  
Twenty-sixth Day of January, 2016

Michelle K. Lee  
*Director of the United States Patent and Trademark Office*